United States Patent
Nishida

(10) Patent No.: US 9,283,827 B2
(45) Date of Patent: Mar. 15, 2016

(54) AIR CONDITIONING REMOTE CONTROL SYSTEM FOR A VEHICLE, SERVER, AND PORTABLE TERMINAL

(75) Inventor: Junichi Nishida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 14/118,012

(22) PCT Filed: May 18, 2011

(86) PCT No.: PCT/JP2011/061439
§ 371 (c)(1),
(2), (4) Date: Nov. 15, 2013

(87) PCT Pub. No.: WO2012/157097
PCT Pub. Date: Nov. 22, 2012

(65) Prior Publication Data
US 2014/0081481 A1    Mar. 20, 2014

(51) Int. Cl.
*B60H 1/00* (2006.01)
*B60L 1/00* (2006.01)
*B60L 11/18* (2006.01)
*B60W 10/30* (2006.01)

(52) U.S. Cl.
CPC ........ *B60H 1/00735* (2013.01); *B60H 1/00771* (2013.01); *B60L 1/003* (2013.01); *B60L 11/1805* (2013.01); *B60L 11/1816* (2013.01); *B60L 2230/16* (2013.01); *B60L 2230/40* (2013.01); *B60L 2240/34* (2013.01); *B60L 2240/622* (2013.01); *B60L 2240/70* (2013.01); *B60W 10/30* (2013.01); *Y02T 10/7005* (2013.01); *Y02T 10/7088* (2013.01); *Y02T 10/7291* (2013.01); *Y02T 90/128* (2013.01); *Y02T 90/14* (2013.01); *Y02T 90/16* (2013.01); *Y02T 90/162* (2013.01); *Y02T 90/163* (2013.01)

(58) Field of Classification Search
None
See application file for complete search history.

(56) References Cited

U.S. PATENT DOCUMENTS

2004/0194479 A1    10/2004    Umebayashi et al.

FOREIGN PATENT DOCUMENTS

| JP | A-7-75180 | 3/1995 |
|---|---|---|
| JP | A-2002-120546 | 4/2002 |
| JP | A-2002-264643 | 9/2002 |
| JP | A-2003-74943 | 3/2003 |
| JP | A-2004-256092 | 9/2004 |
| JP | A-2004-322880 | 11/2004 |
| JP | A-2005-112129 | 4/2005 |
| JP | A-2005-138635 | 6/2005 |
| JP | A-2009-89474 | 4/2009 |

*Primary Examiner* — John R Olszewski
*Assistant Examiner* — Gerrad A Foster
(74) *Attorney, Agent, or Firm* — Oliff PLC

(57) ABSTRACT

A portable terminal (300) transmits to a server (210) a request to start pre-air conditioning when the operations to begin pre-air conditioning are performed on the screen of the portable terminal (300). The server (210) predicts whether an air conditioning device (180) will begin cooling or heating on the basis of a set of vehicle location information stored in a vehicle information storage unit (214) and a set of temperature information acquired from a temperature information center, and transmits the prediction results to the portable terminal (300). As a consequence, it is possible to notify the cooling/heating state to a vehicle user in a timely manner.

10 Claims, 5 Drawing Sheets

AIR CONDITIONING REMOTE CONTROL SYSTEM FOR A VEHICLE, SERVER, AND PORTABLE TERMINAL

TECHNICAL FIELD

The present invention relates to an air conditioning remote control system which performs pre-air conditioning for a vehicle passenger compartment by starting an air conditioning device of a vehicle using remote control before a ride.

BACKGROUND ART

Conventionally, an air conditioning remote control system which performs pre-air conditioning for a passenger compartment of a vehicle by starting an air conditioning device of the vehicle using remote control before a ride is known.

For example, in a system disclosed in JP 2005-112129 A (Japanese Patent Application Laid-Open Publication), an operation order for an air conditioning device is transmitted from a mobile phone to an in-vehicle monitor device via a base station. When the in-vehicle monitor device receives the operation order, the monitor device determines whether an in-vehicle battery voltage is higher than a set voltage that enables an air conditioning device to operate/work, and it starts to operate the air conditioning device if the battery voltage is higher than the set voltage. Further, the in-vehicle monitor device notifies the mobile phone of whether or not the air conditioning device has started.

SUMMARY OF INVENTION

However, according to the system disclosed in JP 2005-112129 A, a vehicle user cannot receive information as to which has been carried out, air-conditioner cooling or air-conditioner heating. Further, if the system is tried to be configured to notify the vehicle user of an operation state (hereinafter, referred to as a "cooling/heating state") which enables the vehicle user to recognize which has been carried out, air-conditioner cooling or air-conditioner heating, the system cannot transmit information on the cooling/heating state to the user in a timely manner due to a time lag caused by a communication access of the conventional air conditioning remote control system, or the like.

The present invention has been made to solve the above-mentioned problems, and thus, one of objects of the present invention is to notify a vehicle user of a cooling/heating state of an air conditioning device in a timely manner when the vehicle user performs an operation to start a pre-air conditioning using a portable terminal.

In order to achieve the object, the present invention provides an air conditioning remote control system for a vehicle to start an air conditioning device (180) of the vehicle and to perform a pre-air conditioning in a vehicle passenger compartment before a ride, by transmitting a remote control order from a portable terminal (300) carried by a vehicle user to an in-vehicle communication unit (150) of the vehicle identified by the portable terminal via a server (210) provided to an information center (200) which processes vehicle information, comprising:

a cooling/heating-prediction means (S20), provided outside the vehicle, for performing a cooling/heating-prediction as to which one of cooling and heating will be carried out by the air-conditioning device in response to the remote control order; and a display control means (S33) for making a screen of the portable terminal display a result of the cooling/heating-prediction.

In the present invention, the vehicle user operates the portable terminal to transmit an order to start the pre-air conditioning, so that the order to start is transmitted to the server. When the server receives the order to start the pre-air conditioning from the portable terminal, the server transmits a start request order of the air conditioning device to the in-vehicle communication unit of the vehicle identified by the portable terminal. As a result, the air conditioning device starts.

The cooling/heating-prediction means performs a the cooling/heating-prediction as to which one of cooling and heating will be carried out by the air-conditioning device in response to the remote control order, and the display control means makes the screen of the portable terminal display the result of the cooling/heating-prediction. If an in-vehicle device determines a cooling/heating state after the order (remote control order) to start the pre-air conditioning is transmitted to the in-vehicle communication unit, a notification of the cooling/heating state to the portable terminal is delayed. In addition, the temperature in the vehicle passenger compartment cannot become clear unless an air in the vehicle passenger compartment is circulated by the air conditioning device, and thus, it is difficult to determine the cooling/heating state immediately.

In view of the above, in the present invention, the cooling/heating-prediction means performs the cooling/heating-prediction outside the vehicle. Thus, it is not necessary to determine the cooling/heating state at the vehicle side, and also not necessary to transmit the result of the determination to the portable terminal via the information center. Therefore, a delay caused by the communication access and a time necessary for the determination on the cooling/heating state are shortened, since the cooling/heating-prediction is made outside the vehicle. As a consequence, it is possible to notify the vehicle user of the cooling/heating state in a timely manner. Thus, when the vehicle user performs the operation to start the pre-air conditioning, the user can know/grasp the cooling/heating state without a long delay, to thereby improve the convenience. Note that, the cooling/heating-prediction means obtains the cooling/heating state based on information other than the actual cooling/heating state at the present point in time.

The cooling/heating-prediction means may perform the cooling/heating-prediction based on location information of the vehicle and temperature information at a vehicle location identified by the location information.

In the present invention, the cooling/heating-prediction means obtains the location information which represents the location of the vehicle (vehicle identified by the portable terminal), and obtains the temperature information at the vehicle location identified by the location information. Thereafter, for example, the cooling/heating-prediction is made by comparing a temperature identified by the temperature information (i.e., a temperature when the pre-air conditioning is started) with a threshold for judgment.

Therefore, according to the present invention, the cooling/heating-prediction can be easily performed, and it is possible to notify the vehicle user of the cooling/heating state in a timely manner.

The system of the present invention may comprise cooling/heating-prediction update means (S44, S45) for obtaining outlet information of the air conditioning device after the air conditioning device starts, performing a cooling/heating-prediction based on the outlet information, and changing the result of the cooling/heating-prediction by the cooling/heating-prediction means to a result of the cooling/heating-prediction based on the outlet information.

In the present invention, the cooling/heating-prediction update means obtains the outlet information of the air conditioning device after the air conditioning device starts. The outlet information means information representing set state of outlets through which the air for the air conditioning is sent to the vehicle passenger compartment. The vehicle has a plurality of outlets, such as a front outlet for sending the air towards a face of a vehicle passenger, a foot outlet for sending the air towards a foot of the vehicle passenger. Cold air is supplied from the front outlet in the case of cooling, and warm air is supplied from the foot outlet in the case of heating.

The cooling/heating-prediction update means performs the cooling/heating-prediction based on the outlet information representing the set state of the outlets, and changes the result of the cooling/heating-prediction by the cooling/heating-prediction means to the result of the cooling/heating-prediction based on the outlet information. Therefore, the cooling/heating-prediction having high precision is obtained. The display control means makes the screen of the portable terminal display the updated/changed result of the cooling/heating-prediction on the screen. Accordingly, the vehicle user can know the updated cooling/heating-prediction.

The system of the invention may comprise:

location information transmitting means (150), provided to the in-vehicle communication unit, for transmitting the location information of the vehicle to the server every time a predetermined timing comes; and location information storage means (214), provided to the server, for storing the location information of the vehicle transmitted from the location information transmitting means;

and wherein, the cooling/heating-prediction means performs the cooling/heating-prediction by obtaining (S21) temperature information at a vehicle location identified by a latest vehicle location information stored in the location information storage means, and by comparing (S23-S25) a temperature identified by the temperature information with a threshold for judgment.

In the present invention, the in-vehicle communication unit is provided with the location information transmitting means, and the server is provided with the location information storage means. The location information transmitting means transmits the location information of the vehicle to the server every time the predetermined timing comes. The location information storage means stores the location information of the vehicle transmitted from the location information transmitting means. The cooling/heating-prediction means obtains, from the location information storage means, the latest location information of the vehicle identified by the portable terminal with which the remote control order for the the pre-air conditioning is made, and obtains the temperature information at the vehicle location identified by the location information of the vehicle. The cooling/heating-prediction means performs the cooling/heating-prediction by comparing the temperature (temperature when the pre-air conditioning is started) identified by the temperature information with the threshold for judgment.

Accordingly, the server grasps the location of the vehicle when the pre-air conditioning is performed in advance. Thus, the cooling/heating-prediction can be performed in a short time. Therefore, it is possible to notify the vehicle user of the cooling/heating state in a timely manner.

The cooling/heating-prediction means may be provided to the server, and may transmit the result of the cooling/heating-prediction to the portable terminal. Further, the present invention can be applied to the server used for the air conditioning remote control system for a vehicle, wherein the server comprises the cooling/heating-prediction means, and transmits the result of the cooling/heating-prediction to the portable terminal. Furthermore, the present invention can be applied to the portable terminal used for the air conditioning remote control system for a vehicle, wherein the portable terminal receives the result of the cooling/heating-prediction transmitted from the server, comprises the display control means, and displays the result of the cooling/heating-prediction transmitted from the server.

In the present invention, the server performs the cooling/heating-prediction, and transmits the result of the cooling/heating-prediction to the portable terminal. Accordingly, the vehicle user can confirm the cooling/heating state without waiting for a long time, after the vehicle user performs the operation of the order to start the pre-air conditioning.

Further, according to the present invention, a server may be provided to be used in the air conditioning remote control system of a vehicle, wherein the server transmits information necessary to perform the cooling/heating-prediction to the portable terminal (S12). In addition, a portable terminal may be provided to be used in the air conditioning remote control system of a vehicle, wherein the portable terminal receives the information necessary to perform the cooling/heating-prediction, the information transmitted from the server. The portable terminal may comprise the cooling/heating-prediction means and the display control means to perform the cooling/heating-prediction based on the information transmitted from the server (S20'), and may display a result of the cooling/heating-prediction on a screen.

In the present invention, the server obtains and transmits the information necessary to perform the cooling/heating-prediction to the portable terminal. The portable terminal receives the information necessary to perform the cooling/heating-prediction based on the information, and displays the result of the cooling/heating-prediction on the screen. For example, the server obtains the temperature information at the vehicle location, and transmits the temperature information to the portable terminal. The portable terminal performs the cooling/heating-prediction based on the received temperature information. Further, for example, the server transmits the location information of the vehicle to the portable terminal, and the portable terminal obtains the temperature information at the vehicle position identified by the location information of the vehicle to perform the cooling/heating-prediction based on the temperature information. Therefore, according to the present invention, the vehicle user can confirm the cooling/heating state without waiting for a long time, after the vehicle user performs the operation of the order to start the pre-air conditioning.

Further, the server according to the present invention may be provided to an information center which processes the vehicle information. The server receives the remote control order from the portable terminal carried by the user of the vehicle, and transmits, to the in-vehicle communication device of the vehicle identified by the portable terminal, the order to start the air conditioning device of the vehicle so as to perform the pre-air conditioning in the vehicle passenger compartment before a ride. The server may comprise the cooling/heating-prediction means for performing the cooling/heating-prediction as to which one of cooling and heating will be carried out by the air-conditioning device in response to the remote control order, and display control means for transmitting the information to have the screen of the portable terminal display the result of the cooling/heating-prediction to the portable terminal.

Further, according to the present invention the portable terminal may be provided, which is for starting the air conditioning device of the specified vehicle, and for performing the pre-air conditioning in the vehicle passenger compartment before a ride, by transmitting the remote control order regarding the pre-air conditioning to the in-vehicle communication unit of the vehicle through the server provided to the information center which processes vehicle information. The portable terminal may comprise cooling/heating-prediction means for performing the cooling/heating-prediction as to which one of cooling and heating will be carried out by the air-conditioning device in response to the remote control order, and display control means for displaying the result of the cooling/heating-prediction.

Note that, in the above description, the element of the invention corresponding to the embodiment is described using a reference sign placed between brackets, however, each element of the invention should not be limited to the element of the embodiment prescribed using the reference sign.

DESCRIPTION OF EMBODIMENTS

Figure 1:
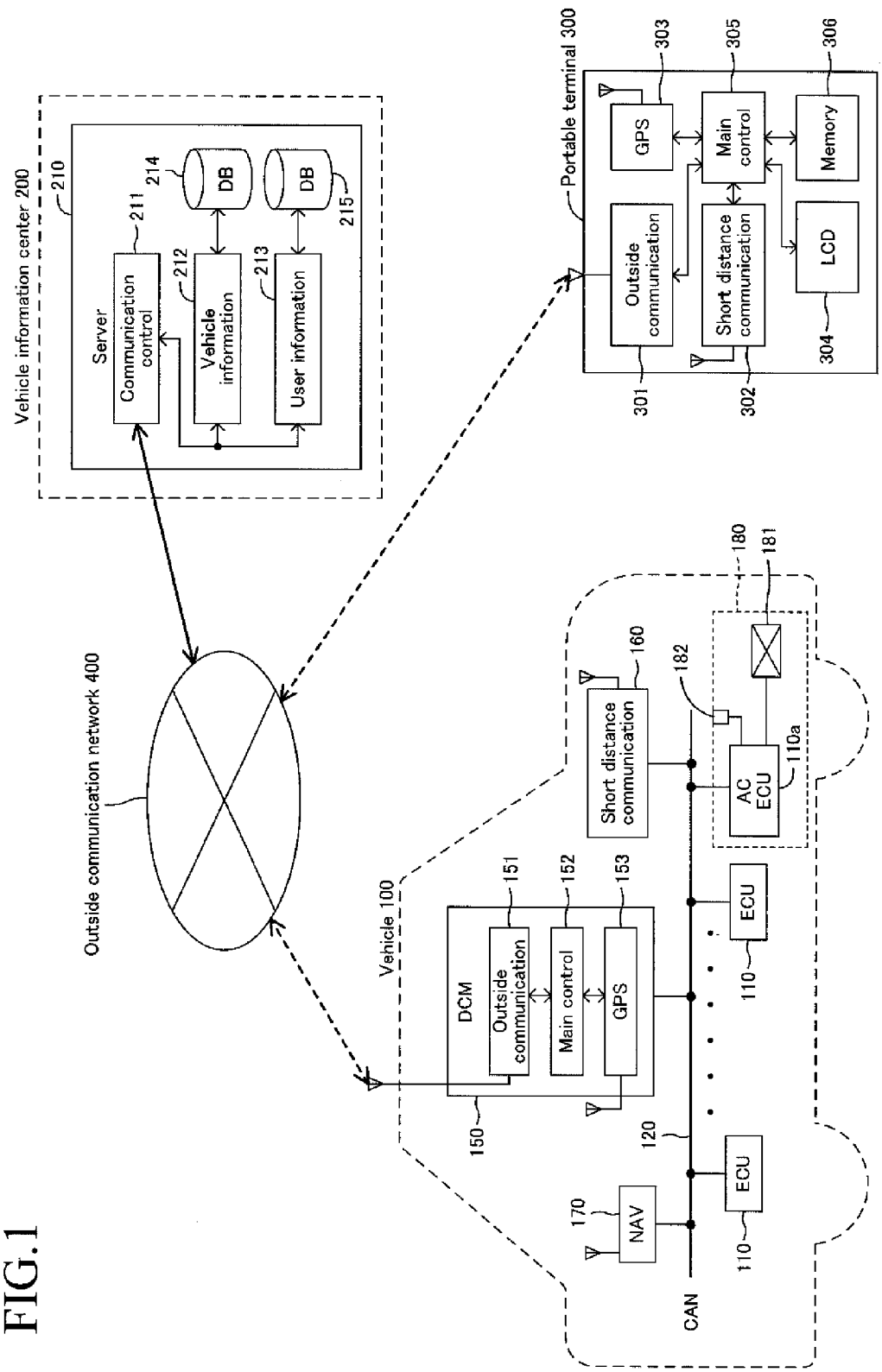
FIG. 1 is a figure which shows an outline configuration of an information communication system of a vehicle to which an air conditioning remote control system according to an embodiment of the present invention is applied.

A vehicle air conditioning remote control system according to an embodiment of the present invention is described with reference to the drawings. FIG. 1 shows an information-communication system for a vehicle. The vehicle air conditioning remote control system of the present embodiment is applied to the information-communication system.

At first, the information-communication system for a vehicle is described. The information-communication system for a vehicle cooperatively connects among a vehicle 100, a vehicle information center 200, and a portable terminal 300 owned by a user of the vehicle (vehicle user), via an outside communication network 400 such as an Internet, to provide various services to the vehicle user. The vehicle 100 comprises a plurality of electronic controllers 110 (hereinafter, each referred to as a vehicle ECU 110) for controlling a state of the vehicle 100. Each vehicle ECU 110 is connected to a CAN (Controller Area Network) communication line 120 of a CAN communication system. Each vehicle ECU 110 can transmit and receive various signals via the CAN communication line 120. An air conditioning ECU 110a is one a plurality of those ECUs 110 connected to the CAN communication line 120. The air conditioning ECU 110a constructs a controller for an air conditioning device (automatic air-conditioning device) 180. Hereinafter, when the air conditioning ECU 110a does not need to be distinguished from the other vehicle ECUs 110, the air conditioning ECU 110a is merely referred to as the vehicle ECU 110. Each vehicle ECU 110 comprises a microcomputer, a memory, an input and output interface, a drive circuit for receiving sensor signals and driving various actuators, and the like.

The CAN communication line 120 is connected to a data communication module 150 (referred to as a DCM 150) for communicating with the vehicle information center 200 through a connection with the outside communication network 400. The DCM 150 comprises: an outside communication control unit 151 for performing data communication with a server 210 of the vehicle information center 200 via the outside communication network 400; a main control section 152 for performing data communication with the vehicle ECU 110 through the CAN communication line 120 to receive control information from the vehicle ECU 110 and for transmitting instructions to the vehicle ECU 110; and a GPS unit 153 for detecting coordinates of a present location of the vehicle on the basis of electric waves from GPS satellites. The DCM 150 comprises a microcomputer as a main element, a memory, a radio communication circuit, an input/output interface, and the like.

Further, a short distance communication control unit 160 is connected to the CAN communication line 120. The short distance communication control unit 160 serves as a communication interface to perform a short distance wireless communication with the portable terminal 300. In the present embodiment, Bluetooth is adopted for the short distance communication control unit 160, however, Wi-Fi or the like can be adopted. In addition, a navigation device 170 for guiding a vehicle to a destination is connected to the CAN communication line 120. The navigation device 170 comprises a vehicle location sensing unit which detects the location and the running direction of the vehicle, a memory which stores various information such as geographic data, a microcomputer which executes an application program to guide the vehicle to the destination, a human interface having a touch panel-type liquid crystal display and a speaker, and the like (not shown).

The vehicle information center 200 is a center which acquires various kinds of vehicle information from the vehicle 100 and provide various kinds of service information to the vehicle user. The vehicle information center 200 comprises the server 210 having a microcomputer as main element. The server 210 comprises a communication control unit 211 which performs a communication control while communicating with the outside communication network 400, a vehicle information server 212 for managing the vehicle information, an user information server 213 for managing user information of the vehicle, a vehicle information storage unit 214 for constructing a database of the vehicle information, and an user information storage unit 215 for constructing a database of the user information. The server 210 stores a relating information which relates an ID (information corresponding to a registration number and a body number) for identifying the vehicle 100 to an ID (user name, phone number of the portable terminal 300, e-mail address, and the like) for identifying the vehicle user, so that the server 210 is configured to be able to identify one of the IDs so as to extract information identified by the other of the IDs. Note that, the vehicle information server 212 includes a function to remotely control (remote control) the vehicle 100 as well as the function to manage the vehicle information.

For example, a cell-phone such as a smartphone can be used as the portable terminal 300 owned by the vehicle user. The portable terminal 300 comprises: an outside communication control unit 301 which is a communication interface for a connecting with the outside communication network 400; a short distance communication control unit 302 which is a communication interface to perform the short distance wireless communication using Bluetooth; a GPS unit 303 which detects coordinates of a present location of the portable terminal 300 on the basis of electric waves from the GPS satellites; a touch-panel-type liquid crystal display 304 used as both an display/indicator and an controller (operation device); a main control section 305 having a microcomputer for performing a communication control and for executing various application programs; and a nonvolatile memory 306 which stores the application programs and various kinds of data. The portable terminal 300 fulfills a function for telephoning, a function for e-mail, a function for accessing the internet, and a function for executing various application programs, as well as a function for providing and receiving various information using a connection with the server 210 of the vehicle information center 200.

In the present embodiment, the vehicle 100 to which the information-communication system is preferably applied is an electric vehicle which drives a motor for running with electric power of a battery, or a plug in type hybrid vehicle having a motor for running and an internal combustion engine in which a battery for a electric power supply for the motor is configured to be charged using a charger. However, the vehicle 100 to which the information-communication system may be a conventional vehicle having an internal combustion engine without a motor for running. That is, the vehicle 100 may be a vehicle having any kind of driving source for running.

In such an information-communication system of a vehicle, various information about the vehicle 100 can be transmitted together with the vehicle ID (information corresponding to the registration number and the body number) to the server 210 of the vehicle information center 200 from the DCM 150. In addition, the server 210 can transmit information useful for the vehicle user to the portable terminal 300. For example, the DCM 150 obtains information representing a state of charge (SOC) of the battery detected by the ECU 110 managing a charge of the battery through the CAN communication line 120, and transmits the obtained SOC information to the server 210 of the vehicle information center 200 together with the vehicle ID and the vehicle location information periodically. Therefore, the server 210 of the vehicle information center 200 can obtain the SOC of the battery of the vehicle 100 together with the vehicle location, make a search to find available charging stations located within a cruising range of the vehicle 100 using the Internet or the like, when the SOC becomes low, to transmit to the portable terminal 300 of the vehicle user a message to urge the driver to charge the battery together with the result (information regarding the charging stations) of the search.

Further, the DCM 150 transmits to the server 210 a driving information including a running distance (mileage), a driving time, a power consumption, and the like in a one trip section together with the vehicle ID and the vehicle location information, the one trip section being a period from a time at which an ignition key switch (or an accessory switch) is turned on to a time at which the switch is turned off. The server 210 has the vehicle information storage unit 214 store the received driving information and the vehicle location information together with the vehicle ID. Thereby, the vehicle user can start an application of the portable terminal 300 to obtain necessary information from the server 210. For example, when the vehicle user starts an application installed in the portable terminal 300 to request the server 210 to send information about an electric mileage and/or a fuel consumption (mileage), the server 210 generates information according to the request of the vehicle user on the basis of the driving information stored in the vehicle information storage unit 214 to send the and the generated information to the portable terminal 300.

Note that, the vehicle location information which is transmitted every time the one trip section ends is used as information to perform a cooling/heating-prediction at a pre-air conditioning described later.

In addition, for example, the vehicle user can transmit the latest map information, the facility information, or the like which has been downloaded into the portable terminal 300 from a site on the Internet to the vehicle 100 side. In this case, the information downloaded into the portable terminal 300 is transmitted to the short distance communication control unit 160 of the vehicle 100 from the short distance communication control unit 302, and is stored in the memory of the navigation device 170.

Further, in the information-communication system for a vehicle, an operation command can be transmitted from the portable terminal 300 of the vehicle user to the server 210 of the vehicle information center 200 to remotely control the vehicle 100 via the server 210. One of such functions is the pre-air conditioning. The pre-air conditioning means starting the air conditioning device 180 before a ride (before getting on the vehicle 100) to perform an air conditioning in the vehicle passenger compartment in advance. In the present embodiment, the vehicle user operates the portable terminal 300 to start/stop the pre-air conditioning. Further, a function to display/indicate a cooling/heating state which indicates which one of a cooling operation or a heating operation is being performed by the air conditioning device 180 on the display 304 of the portable terminal 300, after the pre-air conditioning is started.

The air conditioning device 180 to perform the air conditioning in the vehicle passenger compartment comprises: the air conditioning ECU 110a including a microcomputer as a main element for performing an air conditioning control; an output device group 181 including a compressor, a fan, an outlet reshuffling damper, or the like; and a sensor group 182 including temperature sensors which detect a temperature of the vehicle passenger compartment and a temperature of an outside of the vehicle passenger compartment, a sunlight sensor which detect a quantity of a sunlight, or the like.

The air conditioning ECU 110a controls operations of the output device group 181 to perform the air conditioning in the vehicle passenger compartment based on the detected values by the the sensor group 182 and a set temperature set by occupants of the vehicle 100.

Figure 2:
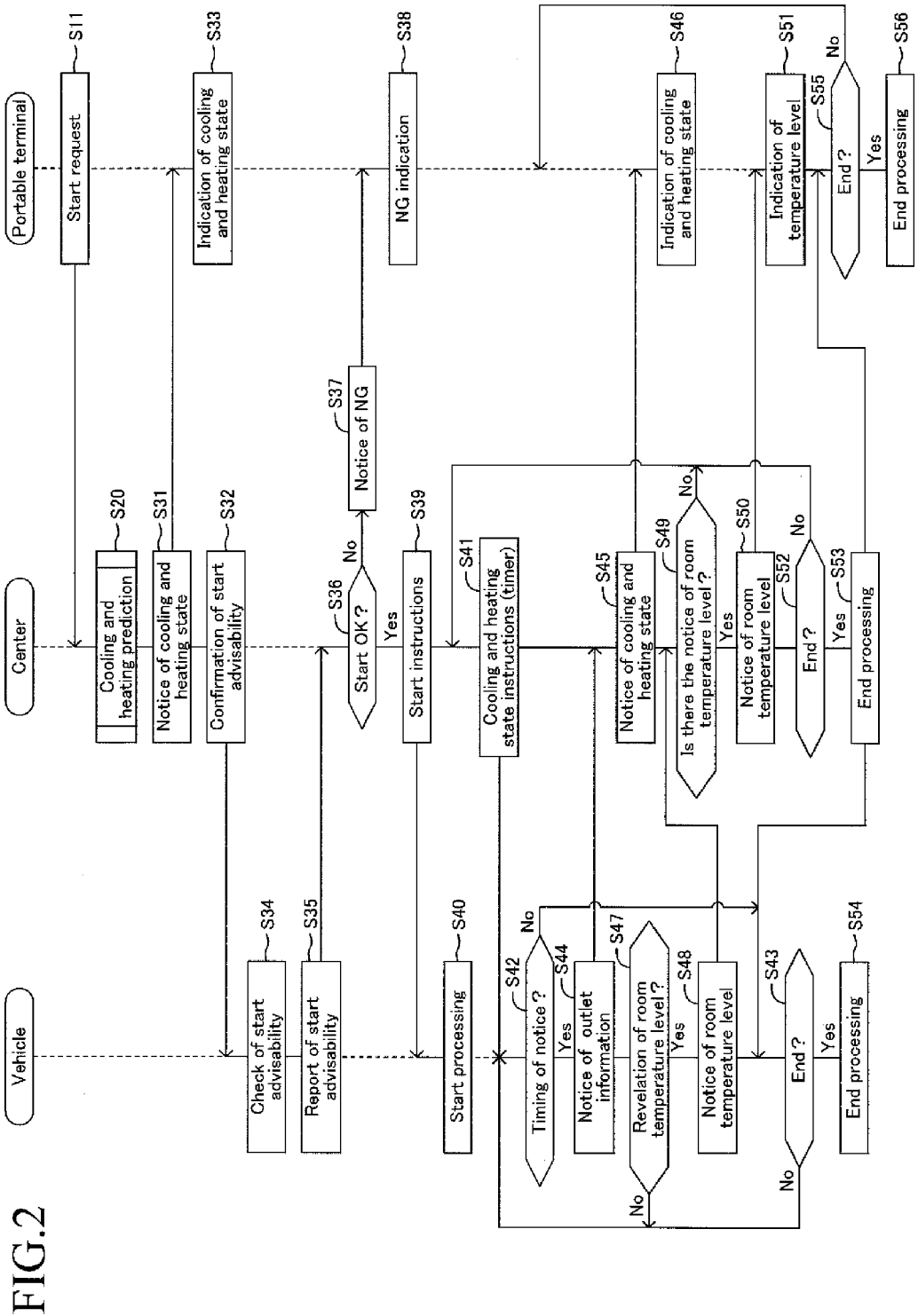
FIG. 2 is a flowchart representing a pre-air conditioning control routine.

The control in the pre-air conditioning will next be described. FIG. 2 shows a flowchart showing a pre-air conditioning control routine. The pre-air conditioning is performed by a collaboration of the portable terminal 300, the server 210 of the vehicle information center 200, the DCM 150 of the vehicle 100, and the ECU 110.

Firstly, in order to start the pre-air conditioning, the vehicle user starts the application for the pre-air conditioning by operating the portable terminal 300. The application for pre-air conditioning is stored in the nonvolatile memory 306 of the portable terminal 304 beforehand. In the following description, the main control section 305 of the portable terminal 300 executing the application program for the pre-air conditioning is simply referred to as the portable terminal 300.

Figure 3:
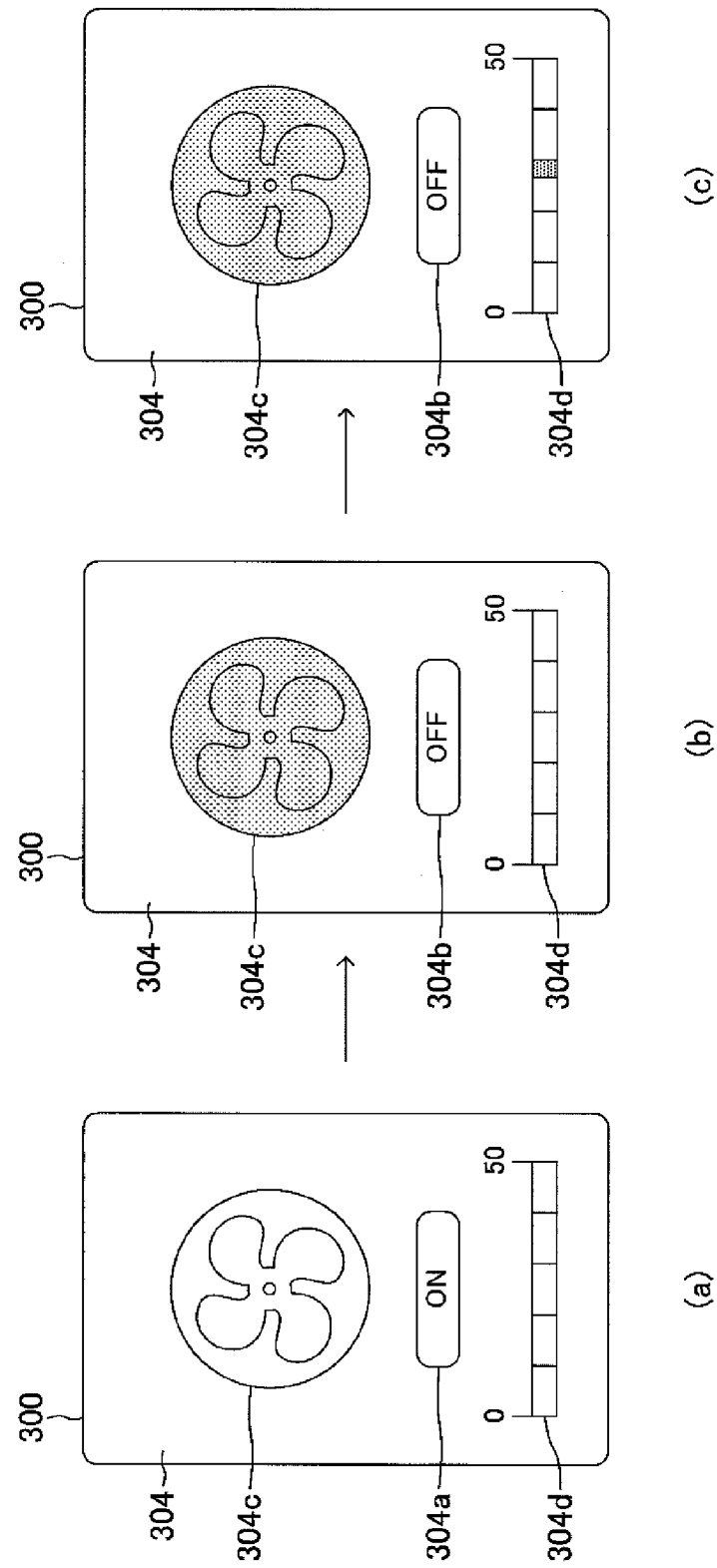
FIG. 3 is a figure representing the change of the screen of a portable terminal.
Figure 4:
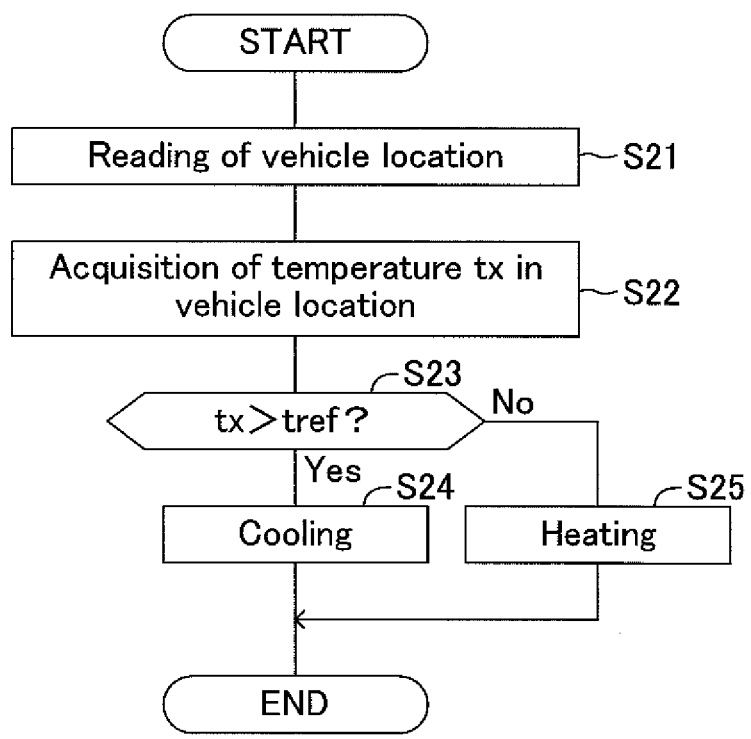
FIG. 4 is a flowchart representing a cooling/heating-prediction routine.

As shown in FIG. 3 (a), a pre-air conditioning initial screen is displayed on the display 304 of the portable terminal 300 after the application for the pre-air conditioning is started. The vehicle user touches a pre-air conditioning start button icon 304a displayed on the initial screen. The portable terminal 300 thereby transmits a start request of the pre-air conditioning to the server 210 of the vehicle information center 200 at step S11. Note that, the portable terminal 300 always transmits the portable terminal ID to the server 210 whenever it communicates with the server 210. When the server 210 receives the start request of the pre-air conditioning transmitted from the portable terminal 300, the server 210 performs a process for the cooling/heating-prediction at step S20. The process for the cooling/heating-prediction is carried out according to a cooling/heating-prediction routine shown in FIG. 4.

When the server 210 starts the cooling/heating-prediction routine, the server 210 firstly obtains/reads the vehicle location information stored in the vehicle information storage unit 214 at step S21. The vehicle location information is transmitted to the server 210 from the DCM 150 together with the driving information in the one trip section as well as the vehicle ID to be stored in the vehicle information storage unit 214, whenever the ignition switch (or the accessory switch) of the vehicle 100 is changed from an on state to an off. Therefore, the server 210 recognizes/grasps a current vehicle location of the vehicle 100 in which the pre-air conditioning is about to be performed by reading the latest vehicle location information of the vehicle 100 corresponding to the ID of the portable terminal 300 from the vehicle information storage unit 214 at step S21.

Subsequently, the server 210 obtains temperature information at the vehicle location at step S22. For example, the server 210 obtains the temperature information for each area provided by a temperature information center or the like via the Internet or the like, and always stores the latest temperature information into the memory (or the vehicle information storage unit 214). At step S22, the server 210 retrieves the temperature information for the vehicle location at the start time of the pre-air conditioning from the latest temperature information stored in the memory to obtain a temperature tx at the vehicle location.

The server 210 determines whether the temperature tx is higher than a predetermined threshold tref for the air-conditioning judgment at step S23. The server 210 sets the cooling/heating-prediction to "cooling" at step S24 when the temperature tx is higher than the threshold tref, and sets the cooling/heating-prediction to "heating" at step S25 when the temperature tx is lower than or equal to the threshold tref. Note that, in the present example, one threshold tref is used, however, a threshold tref1 for cooling judgment and a threshold tref2 (<tref1) for heating judgment may be used. In this case, the cooling/heating-prediction is set to "cooling" when the temperature tx is higher than the threshold tref1 for cooling judgment, and the cooling/heating-prediction is set to "heating" when the temperature tx is lower than the threshold tref2 for heating judgment.

When the cooling/heating-prediction is completed at step S24 or step S25, the server 210 ends the cooling/heating-prediction routine.

When the cooling/heating-prediction is completed, the server 210 notifies the portable terminal 300 of a cooling/heating state representing a result of the cooling/heating-prediction through a communication using a HTTPS (Hypertext Transfer Protocol over Secure Socket Layer) at step S31 in FIG. 2. Further, the server 210 transmits a start-up instruction of the DCM 150 and a start advisability confirmation order of the pre-air conditioning to the DCM 150 (hereinafter, simply referred to as DCM 150) of the vehicle 100 corresponding to the ID of the portable terminal 300, using a SMS (Short Message Service) or a voice message, at step S32.

When the portable terminal 300 receives the notice of the cooling/heating state from the server 210, the portable terminal 300 changes a color of a cooling/heating state indication area 304c in a pre-air conditioning status screen displayed on the display 304 in accordance with the cooling/heating state (result of the cooling/heating-prediction) at step S33, as shown in FIG. 3 (b). In the present embodiment, the color of the cooling/heating state indication area 304c is changed to blue color when the cooling/heating state is "cooling", and to orange color when the cooling/heating state is "heating". Therefore, the vehicle user can know/grasp the cooling/heating state by the screen of the portable terminal 300 at this stage. In this pre-air conditioning status screen, the pre-air conditioning start button icon 304a which has been displayed in the pre-air conditioning initial screen is replaced with a pre-air conditioning stop button icon 304b.

On the other hand, the DCM 150 of the vehicle 100 starts according to the start-up instruction transmitted from the server 210 to start the CAN communication system, and transmits, according to the start advisability confirmation order of the pre-air conditioning, the start advisability confirmation order to the vehicle ECU 110 which confirms a vehicle state.

The pre-air conditioning is permitted to be performed only when a predetermined condition is satisfied. For example, the predetermined condition is a condition which is satisfied when all doors and the trunk of the vehicle are closed, all doors are locked, the ignition switch is off, and the accessory switch is off. The vehicle ECU 110 checks the vehicle state at step S34 to transmit a result of the check to the DCM 150. The DCM 150 transmits a start advisability report to the server 210 through the communication using the HTTP (Hypertext Transfer Protocol) at step S35. Thereafter, the HTTP is used for the communication between the DCM 150 and the server 210.

The server 210 determines whether the start of the pre-air conditioning is permitted/allowed based on the received start advisability report at step S36, and transmits a notice indicating that the start is not permitted/allowed to the portable terminal 300 at step S37 when the start is not permitted/allowed. When the portable terminal 300 receives the notice indicating that the start is not permitted/allowed, the terminal 300 indicates/shows that the pre-air conditioning cannot be started on the displayed screen at step S38, and then returns the displayed screen to the initial screen.

On the other hand, the server 210 transmits a start-up instruction of the pre-air conditioning to the DCM 150 at step S39 when the start of the pre-air conditioning is permitted/allowed (S36: Yes). When the DCM 150 receives the start-up instruction of the pre-air conditioning, the DCM 150 transmits an air conditioning start order to the air conditioning ECU 110a at step S40. The air conditioning ECU 110a thereby performs an air conditioning start-up process, so that the air conditioning in the vehicle passenger compartment is started.

After transmitting the start instruction, the server 210 transmits an order of a notification of the cooling/heating state at step S41. In this case, information to specify a timing (timer time) of the notification of the cooling/heating state is transmitted.

When the DCM 150 receives the order of the notification of the cooling/heating state, the DCM 150 determines whether a time of the notification of the cooling/heating state comes at step S42, and determines whether the DCM 150 stops/ends the pre-air conditioning at step S43 when the present point in time is not the time of the notification of the cooling/heating state. The pre-air conditioning is stopped/ended according to an end instruction from the server 210. Therefore, at step S43, it is determined whether the end instruction from the server 210 has been transmitted or not.

While the end instruction is not received, the DCM 150 waits/stands until the timing of the notification of the cooling/heating state comes, and reads the outlet information from the air conditioning ECU 110a at step S44 when the timing of the notification of the cooling/heating state comes (S42: Yes).

The vehicle 100 has a plurality of outlets, such as a front outlet (face register) for sending air towards a face of vehicle passenger, a foot outlet for sending air towards a foot of the vehicle passenger. The air conditioning ECU 110a operates outlet switching dampers to changes the outlets which blows out air when performing an air conditioning in the vehicle passenger compartment. That is, cold air is supplied from the front outlet in the case of cooling, and warm air is supplied from the foot outlet in the case of heating. The outlet information is information to represent which outlet is used to supply air, namely information representing/indicating a set state of the outlets. For example, the outlet information can be obtained from a control information for the damper of the outlets.

When the DCM 150 reads/obtains the outlet information from the air conditioning ECU 110a, the DCM 150 transmits the outlet information to the server 210 at step S44. The server 210 transmits the notice of the cooling/heating state to the portable terminal 300 based on the outlet information, at step S45. In this case, the server 210 predicts that the cooling/heating state is "cooling" when a mode (face mode) is selected in which the air is blowing using the front outlet, and predicts that the cooling/heating state is "heating" when a mode (foot mode) is selected in which the air is blowing using the foot outlet, and transmits the prediction results as the notice of the cooling/heating state to the portable terminal 300.

When the portable terminal 300 receives the notice of the cooling/heating state transmitted from the DCM 150, the portable terminal 300 changes the color of the cooling/heating state indication area 304c of the screen displayed on the display 304 to a color depending on (corresponding to) the notice of the cooling/heating state at step S46. In this case, when the cooling/heating state represented by the notice of the cooling/heating state which was previously received at step S33 is the same as the cooling/heating state represented by the notice of the cooling/heating state which is currently received at step S36 (namely, the result of the cooling/heating-prediction remains the same), the portable terminal 300 does not change the color of the cooling/heating state indication area 304c. On the other hand, when the result of the cooling/heating-prediction has changed, the portable terminal 300 changes the color of the cooling/heating state indication area 304c to the color corresponding to the notice of the cooling/heating state which is received at step S46.

After the DCM 150 transmits the notice of the outlet information at step S44, the DCM 150 determines whether a current state is a state in which a temperature in the vehicle passenger compartment can properly be detected at step S47. For example, it is determined whether an elapsed time from the point in time at which the air conditioning device 180 started has reached a predetermined set time, and whether a change amount in the temperature of the vehicle passenger compartment detected by the air conditioning ECU 110a has become lower than or equal to a predetermined value.

When the current state is not a state in which the temperature in the vehicle passenger compartment cannot properly be detected (S47: No), the DCM 150 returns to step S42 to repeat the above-mentioned processes. When the current state becomes the state in which the temperature in the vehicle passenger compartment can properly be detected (S47: Yes), the DCM transmits a vehicle passenger compartment temperature level notice which represents a temperature (level) in the vehicle passenger compartment to the server 210, at step S48.

The air conditioning device 180 comprises a vehicle passenger compartment temperature sensor for detecting the temperature in the vehicle passenger compartment, however, there is a great difference between a temperature detected by the vehicle passenger compartment temperature sensor and an actual temperature at a seating location of the passenger just after the air-conditioning is started.

Particularly, when the vehicle is left for a long time under a high temperature environment, the actual temperature of the seating location is considerably higher than the temperature detected by the vehicle passenger compartment temperature sensor. Accordingly, the temperature state in the vehicle passenger compartment is not properly detected (turned out) until the air in the vehicle passenger compartment is circulated to some extent by the operation of the air conditioning device 180. In view of the above, in the present embodiment, the DCM 150 determines whether the current state is the state in which the temperature in the vehicle passenger compartment can properly be detected at step S47, and transmits the notice of the outlet information at the set timing until the temperature in the vehicle passenger compartment can properly be detected. Thereafter, when the current state becomes the state in which the temperature in the vehicle passenger compartment can properly be detected (S47: Yes), the DCM 150 transmits the vehicle passenger compartment temperature level notice to the server 210, at step S48.

In this case, the DCM 150 determines, as the vehicle passenger compartment temperature level, a temperature range obtained by adding a predetermined width to and subtracting the predetermined width from the temperature detected by the vehicle passenger compartment temperature sensor transmitted from the air conditioning ECU 110a, and transmits the notice representing the vehicle passenger compartment temperature level to the server 210.

After the server 210 transmits the notice of the cooling/heating state to the portable terminal 300 at step S45, the server 210 determines whether the vehicle passenger compartment temperature level notice has been received at step S49. The server 210 returns to step S41 until the vehicle passenger compartment temperature level notice is received. Therefore, every time the server 210 transmits the notice of the cooling/heating state to the portable terminal 300, the server 210 transmits a next order (timer time) of the notification of the cooling/heating state to the DCM 150. When the server 210 receives the vehicle passenger compartment temperature level notice (S49: Yes), the server 210 transfers the vehicle passenger compartment temperature level notice to the portable terminal 300 at step S50.

When the portable terminal 300 receives the vehicle passenger compartment temperature level notice, the portable terminal 300 displays the temperature level on the pre-air conditioning status screen at step S51, as shown in FIG. 3 (c). A temperature indicator (meter) 304d having a temperature scale to indicate/show a temperature in the vehicle passenger compartment is displayed on the pre-air conditioning status screen. The portable terminal 300 displays the vehicle passenger compartment temperature level using the temperature indicator 304d from a point in time at which the vehicle passenger compartment temperature level notice is received. In this case, the temperature range corresponding to the vehicle passenger compartment temperature level is displayed, for example, using a color which is different from a color corresponding to a different temperature range so as to be distinguishable.

In addition, the portable terminal 300 changes an indication manner of the cooling/heating state indication area 304c, depending on (in accordance with) the vehicle passenger compartment temperature level. For example, the portable terminal 300 changes a color density of the color displayed on the cooling/heating state indication area 304c depending on (in accordance with) the vehicle passenger compartment temperature level. In this case, when the cooling/heating state is "cooling", the density of blue color is made thicker as the vehicle passenger compartment temperature level is lower. In addition, when the cooling/heating state is "heating", the density of orange color is made thicker as the vehicle passenger compartment temperature level is higher. Thus, the vehicle user can sensuously/intuitively know/notice the temperature state in the vehicle passenger compartment from the displayed screen of portable terminal 300. Note that, not only the change in the density but also any change including a color change can be adopted in order to change the indication manner of the cooling/heating state indication area 304c.

After the server 210 transmits the vehicle passenger compartment temperature level notice to the portable terminal 300 at step S50, the server 210 determines whether it should end/terminate/stop the pre-air conditioning at step S52. A time duration/period in which the pre-air conditioning is performed has a predetermined limited time (e.g. 10 minutes). This is to limit the electrical power consumption of the in-vehicle battery. Therefore, even if an operation to end the pre-air conditioning is not performed using the portable terminal 300, the pre-air conditioning is automatically stopped/ended when the predetermined time elapses. When the vehicle user wants to stop the pre-air conditioning before the predetermined time elapses, the vehicle user may touch the pre-air conditioning end button icon 304b (refer to FIG. 3 (b)) on the pre-air conditioning status screen of the portable terminal 300.

It should be noted that the pre-air conditioning control routine shown in FIG. 2 is for a case in which the pre-air conditioning is automatically stopped/ended due to the predetermined time. Thus, a case in which the pre-air conditioning is stopped/ended by the vehicle user operation is not shown in FIG. 2. However, the vehicle user stops/ends the pre-air conditioning by the operation of the pre-air conditioning end button icon 304b. In this case, a request to stop the pre-air conditioning is transmitted to the DCM 150 via the server 210 from the portable terminal 300, and an order to stop the pre-air conditioning is transmitted to the air conditioning ECU 110a from the DCM 150 so that the pre-air conditioning is thereby stopped. In this case, an end screen of the pre-air conditioning is displayed on the display 304 of the portable terminal 300, and the application for the pre-air conditioning is ended/terminated by a touch operation of an end confirmation button icon (not shown) on that screen.

The server 210 returns to step S41 to repeat the above processes when the server 210 determines that the present time is not a point in time at which the pre-air conditioning is ended/stopped at step S52. When an elapsed time from the start of the pre-air conditioning reaches the predetermined time, the server 210 makes a "Yes" determination at step S52 to proceed to step S53, at which the server 210 transmits the end instruction to the DCM 150. After the server 210 confirms that the pre-air conditioning is stopped, the server 210 transmits a notice of the pre-air conditioning end to the portable terminal 300.

When the DCM 150 receives the end instruction, the DCM 150 outputs an order to stop/end the air conditioning to the air conditioning ECU 110a at step S54. Thereby, the operation of the air conditioning device 180 stops. When the DCM 150 receives an operation stop report of the air conditioning device 180 from the air conditioning ECU 110a, the DCM 150 transmits an air conditioning operation stop report to the server 210. The server 210 transmits the notice of the pre-air conditioning end to the portable terminal 300 based on the air conditioning operation stop report.

When the portable terminal 300 receives the notice of the pre-air conditioning end at step S55, the portable terminal 300 displays the end screen of the pre-air conditioning at step S56. When the end confirmation button icon displayed on the end screen of the pre-air conditioning is touched, the portable terminal 300 terminates the application for the pre-air conditioning. Note that, the server 210 determines the end of the pre-air conditioning (S52) in the present example, however, the DCM 150 may determine the end of pre-air conditioning to transmit the notice of the pre-air conditioning end to the server 210.

According to the air conditioning remote control system of a vehicle according to the present embodiment described above, when the vehicle user operates the portable terminal 300 to perform a start operation command for the pre-air conditioning, the server 210 of the vehicle information center 200 performs the cooling/heating prediction, and transmits the cooling/heating state representing the result of the cooling/heating prediction to the portable terminal 300, which then displays the cooling/heating state on the display 304. Therefore, the system can notify the vehicle user of the cooling/heating state in a timely manner. Thus, when the vehicle user performs the start operation command, the vehicle user can confirm/know the cooling/heating state without waiting for a long time, and thereby, improving convenience.

Further, in the information-communication system for a vehicle, the vehicle location information is transmitted to the server 210 to be stored every time the predetermined timing comes (e.g., when the ignition switch or the accessory switch is turned off). Therefore, the server 210 utilizes the vehicle location information to perform the cooling/heating-prediction using the temperature at the vehicle location. Accordingly, the cooling/heating-prediction can be performed in a short time.

In addition, after the cooling/heating-prediction based on the temperature at the vehicle location is made, the cooling/heating-prediction is made based on the outlet information having high predictive precision in place of the temperature at the vehicle location. Thus, the vehicle user can know the updated cooling/heating state. Further, when the temperature level in the vehicle passenger compartment becomes clearly obtained, the temperature level is displayed by the temperature indicator 304d, and the density of the color displayed on the cooling/heating state indication area 304c is changed depending on the vehicle passenger compartment temperature level. Therefore, the vehicle user can sensuously understand/grasp the temperature state in the vehicle passenger compartment from the displayed screen of the portable terminal 300. Moreover, the vehicle user can know a progress of the air conditioning well.

The air conditioning remote control system of a vehicle according to the present embodiment has been described above, however, the present invention should not be limited to the embodiment, and various kinds of modifications are possible without departing from the object of the invention.

Figure 5:
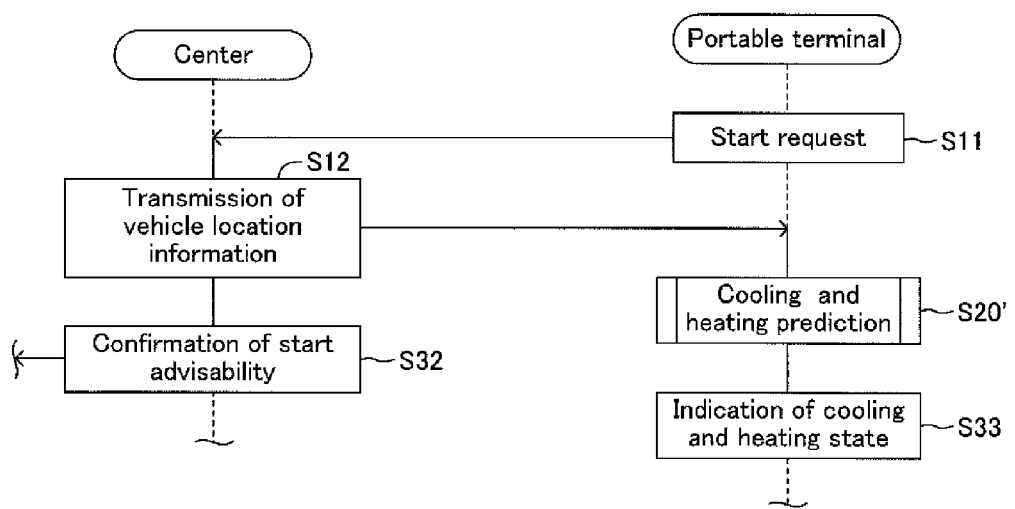
FIG. 5 is a part of a flowchart representing a modification of the pre-air conditioning control routine.

For example, in the present embodiment, the server 210 of the vehicle information center 200 is configured to perform the process for the cooling/heating-prediction (S20), however, the portable terminal 300 may be configured to perform the process for the cooling/heating-prediction in place of the server 210. In this case, the server 210 preferably transmits information necessary for the cooling/heating-prediction to the portable terminal 300. FIG. 5 is a flowchart representing processes concerning that modification. This figure shows only a part which is to be changed in FIG. 2.

In this modification, the server 210 reads out the latest vehicle location information of the vehicle 100 corresponding to the ID of the portable terminal 300 from the vehicle information storage unit 214 on the basis of the start request of the pre-air conditioning transmitted from the portable terminal 300 at step S12 to transmit the vehicle location information to the portable terminal 300. Further, the server 210 transmits a start order for the DCM 150 and a start advisability confirmation order of pre-air conditioning to the DCM 150 based of the start request for the pre-air conditioning transmitted from the portable terminal 300, at step S32.

The portable terminal 300 which received the vehicle location information transmitted from the server 210 performs the processes for the cooling/heating-prediction at step S20'. In the processes for the cooling/heating-prediction, the portable terminal 300 connects itself to the temperature information center via the Internet to obtain the temperature information representing the temperature tx at the vehicle location identified by the vehicle location information at the time of the pre-air conditioning start from the temperature information center. Thereafter, the portable terminal 300 performs the cooling/heating-prediction by executing the processes similar to the processes of step S23-S25 shown in FIG. 4, and displays the result of the cooling/heating-prediction in the pre-air conditioning status screen on the display 304 at step S33. The subsequent processes are performed similarly to the above embodiment.

In the modification described above, when the cooling/heating-prediction is made, only the vehicle location information is transmitted to the portable terminal 300 from the server 210, however, the temperature information may also transmitted to the portable terminal 300 from the server 210. In this case, the server 210 is configured to always obtain the latest temperature information from the temperature information center similarly to the embodiment mentioned above, to store the information into the memory, and to read out and transmit the temperature information representing the temperature tx at the vehicle location of the vehicle 100 based on the start request transmitted from the portable terminal 300. The portable terminal 300 performs the cooling/heating-prediction by executing the processes of step S23-S25 shown in FIG. 4 based on the temperature tx, and displays the result of the cooling/heating-prediction in the pre-air conditioning status screen on the display 304 at step S33.

In such a modification, it is possible to notify the cooling/heating state to the vehicle user in a timely manner, similarly to the embodiment described above.

The present embodiment is configured to update the result of the cooling/heating-prediction from the first cooling/heating-prediction result to the cooling/heating-prediction result based on the outlet information, however, it is not always necessary to update the result of the cooling/heating-prediction. Further, the present embodiment is configured to display the vehicle passenger compartment temperature level on the portable terminal 300 when the temperature in the vehicle passenger compartment is available, however, it is not necessary to display the vehicle passenger compartment temperature level.

In the present embodiment, the server 210 stores the latest temperature information in advance, however, the server 210 may be configured to connect itself to the temperature information center to obtain the temperature information when it receives the start request from the portable terminal 300.

The invention claimed is:

1. An air conditioning remote control system for a vehicle, for starting an air conditioning device of the vehicle and performing a pre-air conditioning in a passenger compartment of the vehicle before a ride, by transmitting a remote control order from a portable terminal carried by a user of the vehicle to an in-vehicle communication unit of the vehicle identified by the portable terminal via a server provided to an information center which processes vehicle information, the pre-air conditioning being performed after the air conditioning remote control system confirms that a start permission condition relating to a predetermined vehicle state has been satisfied, the air conditioning remote control system comprising:
a processor programmed to:
perform a cooling/heating-prediction as to which one of cooling and heating will be carried out by the air-conditioning device in response to the remote control order without obtaining a confirmation result indicating that the permission condition has been satisfied; and
control a screen of the portable terminal to display a result of the cooling/heating-prediction.

2. The air conditioning remote control system for a vehicle according to claim 1, wherein the processor performs the cooling/heating-prediction based on temperature information at a vehicle location identified by location information of the vehicle.

3. The air conditioning remote control system for a vehicle according to claim 1, wherein the processor is programmed to:
obtain outlet information of the air conditioning device after the air conditioning device starts,
perform a cooling/heating-prediction based on the outlet information, and
replace the result of the cooling/heating-prediction with a result of the cooling/heating-prediction made based on the outlet information.

4. The air conditioning remote control system for a vehicle according to claim 1, wherein
the in-vehicle communication unit is configured to transmit location information of the vehicle to the server repeatedly; and
the server is programmed to store the transmitted location information of the vehicle; wherein,
the processor performs the cooling/heating-prediction by obtaining temperature information at a vehicle location identified by a latest vehicle location information stored in the server, and by comparing a temperature identified by the temperature information with a threshold for judgment.

5. The air conditioning remote control system for a vehicle according to claim 1, wherein
the processor is provided in the server, and
the server transmits the result of the cooling/heating-prediction to the portable terminal.

6. The air conditioning remote control system for a vehicle according to claim 1, wherein
the processor is provided in the server, and
the processor performs the cooling/heating-prediction when the server receives the remote control order transmitted from the portable terminal.

7. The air conditioning remote control system for a vehicle according to claim 1, wherein
the processor is provided in the portable terminal, and
when the portable terminal receives information necessary to perform the cooling/heating-prediction transmitted from the server in response to the remote control order transmitted from the portable terminal to the server, the portable terminal performs the cooling/heating-prediction based on the received information.

8. A server, provided to an information center which processes vehicle information, for: (i) receiving a remote control order from a portable terminal carried by a user of a vehicle, and (ii) transmitting, to an in-vehicle communication device of the vehicle identified by the portable terminal, an order to start an air conditioning device of the vehicle so as to perform a pre-air conditioning in a passenger compartment of the vehicle before a ride, the pre-air conditioning being performed after the server confirms that a start permission condition relating to a predetermined vehicle state has been satisfied, the server comprising:
a processor programmed to:
perform a cooling/heating-prediction as to which one of cooling and heating will be carried out by the air-conditioning device of the vehicle in response to the remote control order without obtaining a confirmation result indicating that the permission condition has been satisfied; and
transmit information including a result of the cooling/heating-prediction to the portable terminal for display on a screen of the portable terminal.

9. The server according to claim 8,
wherein the processor performs the cooling/heating-prediction when the remote control order transmitted from the portable terminal is received.

10. A portable terminal for initiating a pre-air conditioning in a passenger compartment of a specified vehicle using an air conditioning device of the vehicle before a ride, by transmitting a remote control order regarding the pre-air conditioning to an in-vehicle communication unit of the vehicle through a server provided to an information center which processes vehicle information, the pre-air conditioning being performed after the portable terminal confirms that a start permission condition relating to a predetermined vehicle state has been satisfied, the portable terminal comprising:
a processor programmed to:
perform a cooling/heating-prediction as to which one of cooling and heating will be carried out by the air-conditioning device in response to the remote control order without obtaining a confirmation result indicating that the permission condition has been satisfied; and
display a result of the cooling/heating-prediction on a screen of the portable terminal.

\* \* \* \* \*